(12) United States Patent
Meijer et al.

(10) Patent No.: US 9,115,448 B2
(45) Date of Patent: Aug. 25, 2015

(54) POLYMER ARTICLES, AND METHODS AND DIES FOR MAKING THE SAME

(75) Inventors: Han E. H. Meijer, Eindhoven (NL); Jerome P Lefevre, Guelph (CA); Kirill Feldman, Zürich (CH); Theodorus A Tervoort, Zürich (CH); Paul Smith, Zürich (CH); Jan Lukas Giesbrecht, Zürich (CH)

(73) Assignee: EIDGENÖSSISCHE TECHNISCHE HOCHSCHULE ZÜRICH, Zürich (CH)

( * ) Notice: Subject to any disclaimer, the term of this patent is extended or adjusted under 35 U.S.C. 154(b) by 1096 days.

(21) Appl. No.: 13/131,892

(22) PCT Filed: Dec. 4, 2009

(86) PCT No.: PCT/EP2009/066464
§ 371 (c)(1),
(2), (4) Date: May 31, 2011

(87) PCT Pub. No.: WO2010/063846
PCT Pub. Date: Jun. 10, 2010

(65) Prior Publication Data
US 2011/0227247 A1    Sep. 22, 2011

Related U.S. Application Data

(60) Provisional application No. 61/193,514, filed on Dec. 4, 2008.

(51) Int. Cl.
*B29C 47/06* (2006.01)
*B29C 47/12* (2006.01)
(Continued)

(52) U.S. Cl.
CPC .............. *D04H 1/56* (2013.01); *B29C 47/0021* (2013.01); *B29C 47/0038* (2013.01); *B29C 47/065* (2013.01); *B29C 47/0014* (2013.01);
(Continued)

(58) Field of Classification Search
None
See application file for complete search history.

(56) References Cited

U.S. PATENT DOCUMENTS 2,991,147 A * 7/1961 Garrod ........................... 156/167
3,266,692 A * 8/1966 Whitten ........................ 226/109
(Continued)

FOREIGN PATENT DOCUMENTS

EP    0474423 A2    3/1992
GB    2178433 A     2/1987
(Continued)

OTHER PUBLICATIONS

International Search Report for PCT/EP2009/066464 (issued May 2, 2011).
(Continued)

*Primary Examiner* — Jeffrey Wollschlager
(74) *Attorney, Agent, or Firm* — Hoyng Monegier LLP; Minerva Rivero; David P. Owen

(57) ABSTRACT

Provided are dies having a first section for orienting material being pressed through the die and a second section for shaping the oriented material into a desired form. In an embodiment, the surface area for shaping the oriented material into a desired form is limited. Also provided are polymer articles and processes for making the same. In an embodiment, the processes employ the dies.

16 Claims, 7 Drawing Sheets

(51) Int. Cl.
*D04H 1/56* (2006.01)
*B29C 47/00* (2006.01)
*B29C 47/02* (2006.01)
*B29C 47/04* (2006.01)
*B29C 47/14* (2006.01)
*B29K 105/00* (2006.01)
*B29L 9/00* (2006.01)

(52) U.S. Cl.
CPC ......... *B29C47/0016* (2013.01); *B29C 47/0019* (2013.01); *B29C 47/0057* (2013.01); *B29C 47/02* (2013.01); *B29C 47/043* (2013.01); *B29C 47/067* (2013.01); *B29C 47/14* (2013.01); *B29K 2105/256* (2013.01); *B29L 2009/00* (2013.01)

(56) References Cited

U.S. PATENT DOCUMENTS

| | | | | |
|---|---|---|---|---|
| 3,543,984 | A | * | 12/1970 | Mansfield .................. 226/196.1 |
| 3,690,978 | A | * | 9/1972 | Nishizawa et al. ........... 156/167 |
| 3,707,593 | A | * | 12/1972 | Fukada et al. ................. 264/555 |
| 4,068,517 | A | * | 1/1978 | Fuchs, Jr. ..................... 72/253.1 |
| 4,332,759 | A | * | 6/1982 | Ide ................................ 264/108 |
| 4,384,016 | A | | 5/1983 | Ide |
| 4,960,552 | A | * | 10/1990 | Portugall et al. .............. 264/108 |
| 4,980,012 | A | * | 12/1990 | Nieda et al. ................... 156/441 |
| 5,186,780 | A | * | 2/1993 | Sakunaga et al. ............. 156/167 |
| 5,282,731 | A | * | 2/1994 | Dinter ........................ 425/133.5 |
| 5,364,669 | A | | 11/1994 | Sumida et al. |
| 5,614,141 | A | | 3/1997 | Sumida et al. |
| 6,045,737 | A | | 4/2000 | Harvey et al. |
| 6,146,764 | A | | 11/2000 | Suokas et al. |
| 6,312,772 | B1 | * | 11/2001 | Kuder et al. ................... 428/1.5 |
| 6,333,086 | B1 | | 12/2001 | Ora et al. |
| 6,790,496 | B1 | | 9/2004 | Levander et al. |
| 6,841,211 | B1 | | 1/2005 | Knoll et al. |
| 2003/0020190 | A1 | * | 1/2003 | Fouser ........................ 264/29.2 |

FOREIGN PATENT DOCUMENTS

| | | | |
|---|---|---|---|
| JP | 63155008 | * | 6/1988 |
| JP | 01118102 | * | 5/1989 |

OTHER PUBLICATIONS

Muramatsu et al. in Macromolecules 19, 2850 (1986).
Wissbrun et al. in J. Polym. Sd. Pt. B-Polym. Phys. 20, 1835 (1982).
Calundann et al. in Proceedings of the Robert A. Welch Conference on Chemical Research, XXVI. Synthetic Polymers, 280 (1982).
Ide et al. in J. Macromol. Sci.-Phys. B23, 497 (1985).
Lusignea in Polym. Eng. ScL, 39, 2326 (1999).
Vectran Brochure, 2000.
Ultra-high-performance polymer foils, Jerome Lefevre, PhD thesis, ETH Zurich Switzerland, 2008.

* cited by examiner

POLYMER ARTICLES, AND METHODS AND DIES FOR MAKING THE SAME

This application is based on International Application number PCT/EP2009/066464 filed on 4 Dec., 2009, which was published under PCT Article 21(2) in English, and which claims priority to U.S. provisional application 61/193,514 filed on 4 Dec. 2008, the content of which is hereby incorporated in its entirety by reference.

FIELD OF THE INVENTION

The present application discloses, inter alia, polymer articles. Also, the present application discloses methods for making the polymer articles. In addition, the present application discloses dies.

BACKGROUND

Efforts have been made to produce high-performance polymer fibers. For the category of thermotropic and lyotropic liquid-crystalline polymers, as an example, publications are available where reasonable success is being reported by directly spinning from the thermotropic melt or lyotropic solution and applying relatively high wind-up/extrusion speed (draw down) ratios that induce elongational flow fields causing the polymer molecules to orient in the direction of flow. For examples, see e.g. Muramatsu et al. in *Macromolecules* 19, 2850 (1986); and Wissbrun et al. in *J. Polym. Sci. Pt. B-Polym. Phys.* 20, 1835 (1982). Producing high-performance films and foils and other objects of these materials, however, has been less successful in one or more aspects. For examples, see e.g. Calundann et al. in Proceedings of the Robert A. Welch Conference on Chemical Research, *XXVI. Synthetic Polymers,* 280 (1982); U.S. Pat. No. 4,332,759; U.S. Pat. No. 4,384,016; Ide et al. in *J. Macromol. Sci.-Phys.* B23, 497 (1985); and Lusignea in *Polym. Eng. Sci.,* 39, 2326 (1999).

SUMMARY

In an embodiment, provided are dies having a first section for orienting material being pressed through the die and a second section for shaping the oriented material into a desired form. In an embodiment, the surface area for shaping the oriented material into a desired form is limited.

In an embodiment, provided is a die comprising:
a spinneret part having a plurality of orifices, the orifices having an inlet and an outlet;
a second part having an opening for receiving fibers from the orifice outlets, the opening having an outlet facing away from the orifice outlets;
wherein the surface area of the outlet of the opening complies with the following formula:

$SA < N \times D^2$ wherein
SA represents the surface area of the outlet of the opening;
N represents the number of orifice outlets of the spinneret part; and
D represents the diameter of the orifice outlets of the spinneret part.

In an embodiment, provided is a die comprising:
a spinneret part having a plurality of orifices, the orifices having an inlet and an outlet;
a second part having an opening for receiving fibers from the orifice outlets, the opening having an outlet facing away from the orifice outlets;
wherein the die complies with the following formula:

$EL \times WO < N \times D^2$ wherein
N represents the number of orifice outlets of the spinneret part;
D represents the diameter of the orifice outlets of the spinneret part;
WO represents the width of the opening; and
EL represents the length of the opening designed to receive material from the spinneret part.

In an embodiment, provided is a die comprising:
a spinneret part having a plurality of orifices, the orifices having an inlet and an outlet;
a second part having an opening for receiving fibers from the orifice outlets, the opening having an opening inlet facing the orifice outlets and an opening outlet facing away from the orifice outlets;
the orifices being arranged such that straight lines from the center of each orifice inlet, through the center of the corresponding orifice outlet, to the opening inlet, do not cross each other.

In an embodiment, provided is a process comprising:
Pressing a polymer, in melt or in solution, through a spinneret to form a plurality of polymer fibers leaving the spinneret,
the spinneret having a plurality of orifices, the orifices having an inlet for receiving the polymer melt or polymer solution and an outlet to dispatch the polymer melt or polymer solution as a fiber; and
Guiding the polymer fibers, while still in the melt or solution, through an opening to form a polymer film leaving the outlet of said opening, wherein the surface area of the outlet of the opening complies with the following formula:

$SA < N \times D^2$ wherein
SA represents the surface area of the outlet of the opening;
N represents the number of orifice outlets of the spinneret; and
D represents the diameter of the orifice outlets of the spinneret.

In an embodiment, provided is a process comprising:
Pressing a polymer, in melt or in solution, through a spinneret to form a plurality of polymer fibers leaving the spinneret,
the spinneret having a plurality of orifices, the orifices having an inlet for receiving the polymer melt or polymer solution and an outlet to dispatch the polymer melt or polymer solution as a fiber; and
Guiding the polymer fibers, while still in the melt or solution, through an opening to form a polymer film leaving the outlet of said opening, wherein the width W and thickness T of the film at the outlet of said opening comply with the following formula:

$W \times T < N \times D^2$ wherein
N represents the number of orifice outlets of the spinneret; and
D represents the diameter of the orifice outlets of the spinneret.

In an embodiment, provided is a process comprising:
Pressing more than one polymer grade, each in melt or in solution, through a spinneret to form a plurality of polymer fibers leaving the spinneret,
the spinneret having a plurality of orifices, the orifices having an inlet for receiving the polymer melt or polymer solution and an outlet to dispatch the polymer melt or polymer solution as a fiber; and
Guiding the polymer fibers, while still in the melt or solution, through an opening to form a polymer film leaving the outlet of said opening,
wherein a first polymer grade is pressed through the majority of the orifices of the spinneret, and a second polymer grade is pressed through one or more of the remaining orifices.

In an embodiment, provided is a polymer film having a width of at least 2 cm, a loss modulus greater than 0.75 GPa, and a storage modulus greater than 20 GPa.

In an embodiment, provided is a polymer film having a width of at least 2 cm, a specific loss modulus greater than 75 km, and a specific storage modulus greater than 1000 km.

In an embodiment, provided is a film of liquid-crystalline polymer, the film having:
a width of at least 5 cm; and
a tensile modulus of at least 50 GPa.

DETAILED DESCRIPTION

Dies

Figure 1:
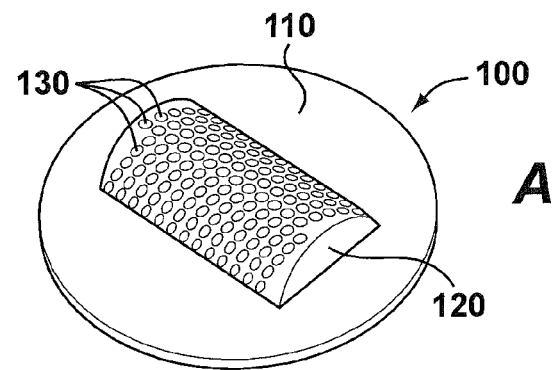
FIGS. 1A-D represent an embodiment of a spinneret part of a die.
Figure 1:
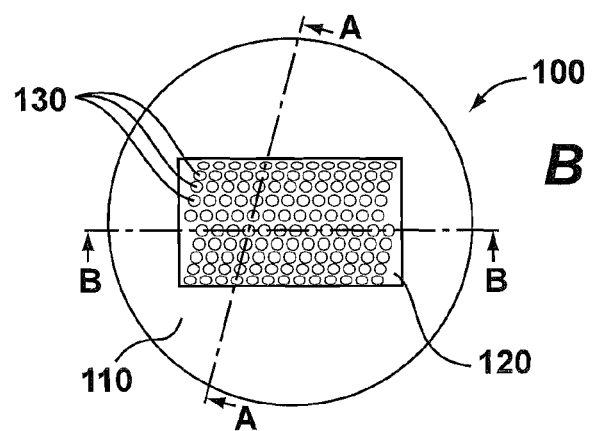
Figure 1:
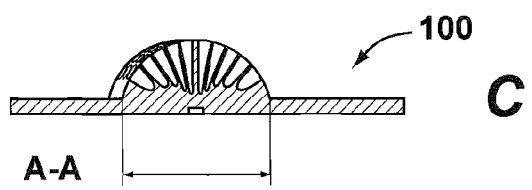
Figure 1:
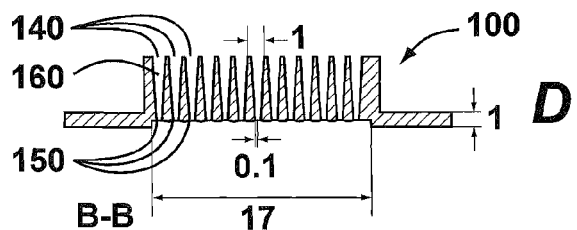

In an embodiment, provided are dies having a first section for orienting material being pressed through the die, for instance a spinneret section, and a second section for shaping the oriented material into a desired form. A benefit of such a die is that a reasonable degree of orientation of the material may already be obtained in the shaped part leaving the second section. This, in turn, may limit or avoid having to significantly change the shape of the material leaving the second section to achieve the desired orientation of the material.

In an embodiment, the surface area for shaping the oriented material into a desired form is limited. This may assist, for instance, in better filling of the second section with the material arriving from the first section, which may for instance assist in decreasing or avoiding the void content in the shaped material leaving the second part.

In an embodiment, provided is a die comprising a spinneret part having a plurality of orifices, the orifices having an inlet and an outlet. In an embodiment, the spinneret part assists in orienting the material (e.g. polymer material) passing through the die. The die further comprises a second part having an opening for receiving fibers from the orifice outlets, the opening having an outlet facing away from the orifice outlets. In an embodiment, the second part assists in joining the plurality of fibers into a desired shape, e.g. into a film, a tube, or a bar. In an embodiment, the opening of the second part is in the shape of a slit. In an embodiment, the opening of the second part is circular, e.g. in the shape of a ring. A benefit of using a spinneret part before a second shaping part is that the spinneret part can assist in orienting the material (e.g. polymer material), thereby providing enhanced properties to the article leaving the second part. In an embodiment, the surface area of the outlet of the opening complies with the following formula:

$$SA < N \times D^2$$

wherein
SA represents the surface area of the outlet of the opening;
N represents the number of orifice outlets of the spinneret part; and
D represents the diameter of the orifice outlets of the spinneret part.

A benefit of SA being smaller than $N \times D^2$ is that the outlet of the opening is better filled with the material being pressed through the opening. This, in turn, may assist in, e.g., preventing void formation in the material being extruded through the outlet of the opening. This may be especially beneficial in situations where, for instance, substantial die swell from the spinneret part is almost absent or, because it would result in disorientation, would be undesirable (i.e., where die swell does not substantially assist in better filling of the opening). In an embodiment, SA is less than $N \times D^2$, for instance less than $0.9 \times N \times D^2$ or less than $0.8 \times N \times D^2$. In an embodiment, SA is about $N \times (\pi/4) \times D^2$. In an embodiment, SA is greater than $0.6 N \times D^2$, for instance greater than $0.7 \times N \times D^2$ or greater than $0.75 \times N \times D^2$.

In an embodiment where the outlet of the second part is in the shape of a slit, the surface area SA is the length of the slit L times the width of the slit outlet WO. In an embodiment, L is about equal to the effective length (EL) of the slit, i.e. the length of the slit that is designed to receive material from the spinneret part. In an embodiment, the effective length of the slit is equal to the distance (measured in a direction parallel to the slit and perpendicular to the width WO) between two orifice outlets that are spaced apart furthest.

In an embodiment for making polymer films, provided is a die comprising a spinneret part having a plurality of orifices, the orifices having an inlet and an outlet; a second part having an opening for receiving fibers from the orifice outlets, the opening having an outlet facing away from the orifice outlets;
wherein the die complies with the following formula:

$$EL \times WO < N \times D^2$$

wherein
N represents the number of orifice outlets of the spinneret part;
D represents the diameter of the orifice outlets of the spinneret part;
WO represents the width of the opening; and
EL represents the length of the opening designed to receive material from the spinneret part.

A benefit of $EL \times WO$ being smaller than $N \times D^2$ is that the section of the outlet of the opening receiving fibers from the spinneret part is better filled with the material being pressed through the opening. This, in turn, may assist in, e.g., preventing void formation in the material being extruded through the outlet of the opening. This may be beneficial, e.g., in situations where, for instance, substantial die swell from the spinneret part is almost absent or, because it would result in disorientation, would be undesirable (i.e., where die swell does not substantially assist in better filling of the opening).

In an embodiment, EL×WO is less than N×D², for instance less than 0.9×N×D² or less than 0.8×N×D². In an embodiment, EL×WO is about N×(π/4)×D². In an embodiment, EL×WO is greater than 0.6 N×D², for instance greater than 0.7×N×D² or greater than 0.75×N×D².

In an embodiment, the orifice outlets in the spinneret part are arranged such that when lines are drawn from the center of each orifice inlet, through the center of the corresponding orifice outlet, to the inlet of the second part, then such lines do not cross each other. Arranging the die in such a manner may assist in preventing the fibers to become entangled before being assembled into the desired shape.

In an embodiment, the orifices are provided in a curved part of the spinneret part. In an embodiment, the curved part has the shape of half a cylinder. In an embodiment, the curved part has the shape of half a sphere. In an embodiment, the orifices are arranged in staggered arrays. A curved spinneret part with staggered arrays may assist in arranging the orifices such that the fibers when being formed in the eventually desired shape (e.g. a film) have all had substantially similar deformation history. Also, the curved spinneret part with staggered arrays may assist in providing a relatively large fiber density in the second part.

In an embodiment, the spinneret part has at least 100 orifices, for instance at least 500 orifices, at least 1000 orifices, at least 2500 orifices, at least 5000 orifices, or at least 10000 orifices. In an embodiment, the number of orifices is less than 100000, e.g. less than 50000, less than 25000, less than 10000, less than 5000, less than 2500, or less than 1250.

In an embodiment, the orifice inlet has a greater surface area than the corresponding orifice outlet. Such a configuration may assist in orienting the material, e.g. polymer material, being pressed through the orifices. In an embodiment, the diameter of the orifice inlet is at least 5 times the diameter of the corresponding orifice outlet, e.g. at least 8 times, at least 12 times, or at least 16 times the diameter of the corresponding orifice outlet. In an embodiment, the diameter of the orifice inlet is less than 50 times the diameter of the orifice outlet. In an embodiment, the channel between the orifice inlet and the orifice outlet is cone-shaped.

In an embodiment, the orifice inlet has a surface area that is about the same as the surface area of the corresponding orifice outlet. In an embodiment, the channel between the orifice inlet and the corresponding orifice outlet is straight.

In an embodiment, the orifice outlets have a diameter of less than 5 mm, e.g. less than 500 micrometers, less than 250 micrometers, less than 100 micrometers, less than 50 micrometers, less than 25 micrometers, or less than 15 micrometers. In an embodiment, the orifice outlets have a diameter of at least 1 micrometer, e.g. at least 3 micrometers, at least 10 micrometers or at least 20 micrometers.

In an embodiment, the second part has an opening outlet in the shape of a slit. In an embodiment, the slit has a length L of at least 1 cm, e.g. at least 2 cm, at least 10 cm, at least 50 cm, at least 100 cm, at least 250 cm, at least 500 cm, or at least 1000 cm. In an embodiment, the slit has a length of less than 10000 cm, e.g. less than 5000 cm, less than 1000 cm, less than 200 cm, less than 100 cm, less than 50 cm, less than 20 cm, less than 15 cm, less than 10 cm, or less than 6 cm. In an embodiment, the slit has an effective length EL of at least 1 cm, e.g. at least 2 cm, at least 10 cm, at least 50 cm, at least 100 cm, at least 250 cm, at least 500 cm, or at least 1000 cm. In an embodiment, the slit has an effective length of less than 10000 cm, e.g. less than 5000 cm, less than 1000 cm, less than 200 cm, less than 100 cm, less than 50 cm, less than 20 cm, less than 15 cm, less than 10 cm, or less than 6 cm. In an embodiment, the second part has an opening outlet that has a circular shape. In an embodiment, the second part has an opening outlet that has a ring shape.

Figure 2:
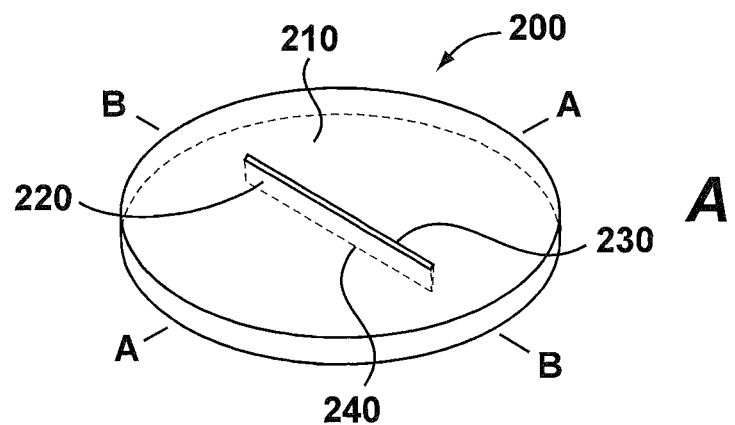
FIGS. 2A-C represent an embodiment of a second part of a die.
Figure 2:
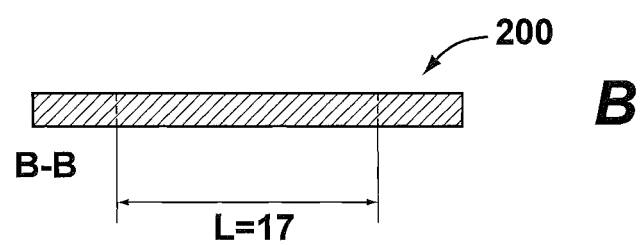
Figure 2:
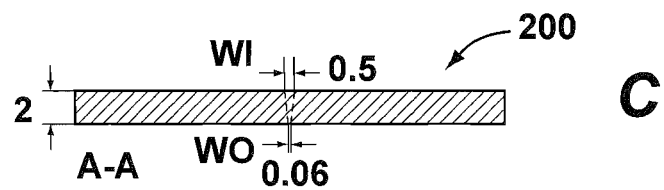
Figure 3:
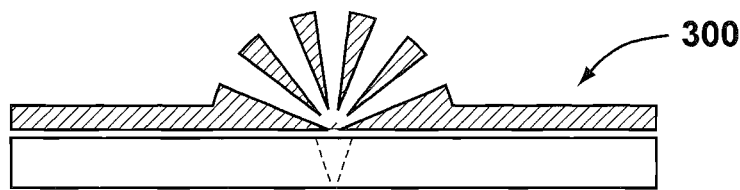
FIG. 3 represents an embodiment of a die.

An example of a die having a spinneret part and a second part is provided in FIGS. 1-3. FIG. 1A is a perspective view of a spinneret part 100 having a circular base 110 and a curved part 120 in the form of half a cylinder. The curved part 120 comprises a plurality of orifices 130. The orifices 130 are arranged over curved part 120 in staggered arrays. The orifices have an inlet 140 (see also FIG. 1D) for receiving material during use (e.g. molten or dissolved polymers) and opposite orifice outlets 150 (see FIG. 1D). Only the inlets are visible in FIG. 1A. FIG. 1B is a top view of the same spinneret part 100. FIG. 1C is a sectional view of spinneret part 100 across the line A-A depicted in FIG. 1B. FIG. 1D is a sectional view of spinneret part 100 across the dotted line B-B in FIG. 1B. Orifices 130 have orifice inlets 140 and corresponding orifice outlets 150, and channels 160 between the orifice inlets and orifice outlets. In this example, as evident from FIG. 1D, the channels are cone-shaped. An example of a second part that may be combined with the spinneret part of FIG. 1 is shown in FIGS. 2A-C. FIG. 2A is a perspective view of a second part 200, having a circular solid part 210 and an opening in the form of a slit 220. The slit has an inlet 230 and an outlet 240. In the example of this figure, the inlet is wider than the outlet. Referring to FIGS. 2B and C, the outlet has a width WO, a length L, and the inlet has a width WI.

Dimensions in FIGS. 1-2 are in millimeters. The length indicated by the double-arrowed line in FIG. 1C is 10 mm. It is noted that FIGS. 1-2 are only illustrative and the dies can, for instance, be scaled up to greater dimensions (e.g. more orifices, a greater spinneret length, a greater slit length, etc.). In the example of FIGS. 1-2, 130 orifices are shown having an outlet diameter of 0.1 mm, so N×D²=1.3 mm². Furthermore, the slit outlet has a length of 17 mm and a width of 0.06 mm, so a surface area of 1.02 mm² (which is about (π/4)×1.3 mm²).

FIG. 3 represent the die 300 obtained when combining the spinneret part 100 of FIG. 1 and the second part 200 of FIG. 2. It is noted that the figure is merely schematic, for instance the number of orifice rows visible in FIG. 3 does not correspond to the number of rows in FIG. 1.

The orifices 130 of the spinneret part 100 of FIG. 1 are arranged such that straight lines from the center of each orifice inlet 140, through the center of the corresponding orifice outlet 150, do not cross each other before the slit inlet 230 of the second part 200 of FIG. 2.

Figure 6:
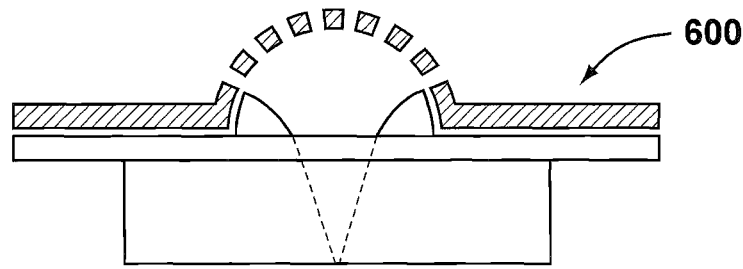
FIG. 6 represents an embodiment of a die.
Figure 4:
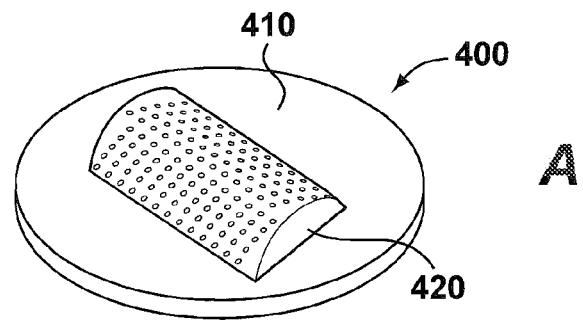
FIGS. 4A-D represent an embodiment of a spinneret part of a die.
Figure 4:
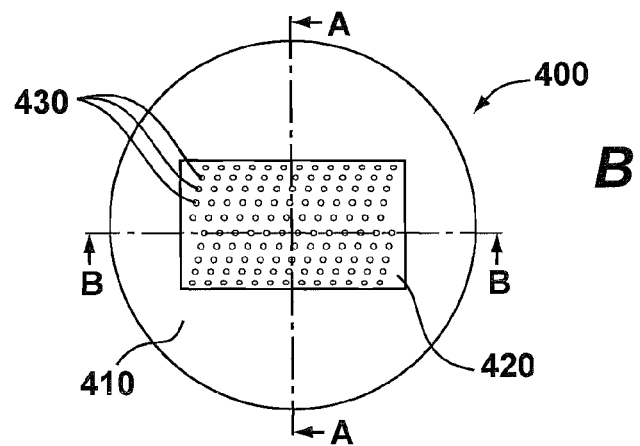
Figure 4:
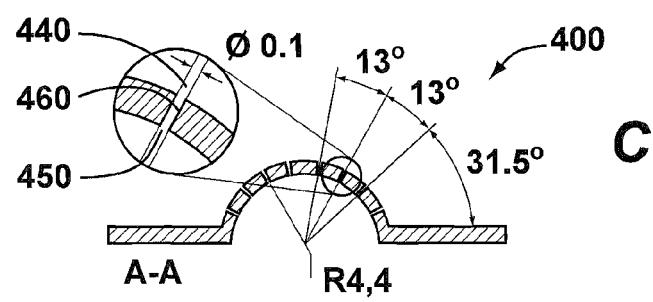
Figure 4:
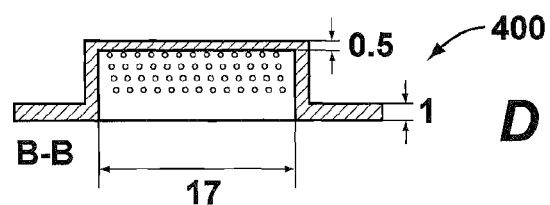
Figure 5:
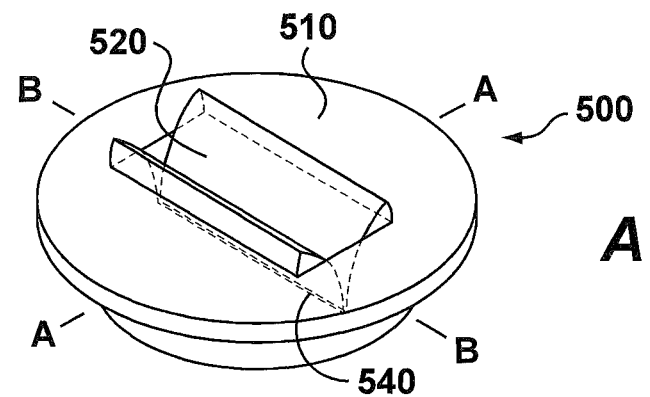
FIGS. 5A-C represent an embodiment of a second part of a die.
Figure 5:
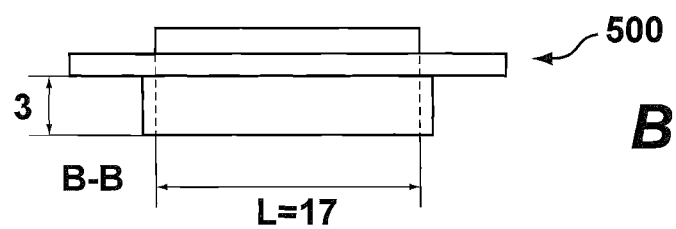
Figure 5:
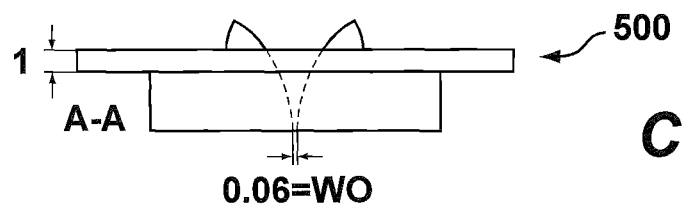

Another example of a die is provided in FIGS. 4-6. FIG. 4A is a perspective view of a spinneret part 400 having a circular base 410 and a curved part 420 in the form of half a cylinder. The curved part 420 comprises a plurality of orifices 430 (FIG. 4B). The orifices 430 are arranged over curved part 420 in staggered arrays. The orifices have an inlet 440 (see FIG. 4C) for receiving material during use (e.g. molten or dissolved polymers) and opposite orifice outlets 450 (see FIG. 4C). FIG. 4B is a top view of the same spinneret part 400 of FIG. 4A. FIG. 4C is a sectional view of spinneret part 400 across the dotted line A-A depicted in FIG. 4B. FIG. 4D is a sectional view of spinneret part 400 across the dotted line B-B in FIG. 4B. Referring to FIG. 4C, orifices 430 have orifice inlets 440 and corresponding orifice outlets 450, and channels 460 between the orifice inlets and orifice outlets. In this example, as evident from FIG. 4C, the channels are straight.

As evident from FIG. 4, a difference with the spinneret part of FIG. 1 is that the channels 460 are straight rather than cone-shaped. Also, the curved section of the spinneret part 400 is hollow whereas, except for the orifices themselves, the curved section of spinneret part 100 is solid. As a result, the distance between the orifice outlets and the outlet of the opening of the second part is generally larger for spinneret type 400 than for spinneret type 100. A benefit of spinneret part 400 is, e.g., that it is generally easier to make than spinneret part 100. A benefit of spinneret part 100 is, e.g., that the risk of orientation loss in the fibers when traveling from the orifice outlet to the opening outlet of the second part is somewhat lower. This may become apparent when material of relatively low viscosity is pressed through the dies, i.e. material with relatively fast relaxation times.

An example of a second part that may be combined with the spinneret part of FIG. 4 is shown in FIG. 5. FIG. 5 is a perspective view of a second part 500, having a circular solid part 510 and an opening 520, having an outlet 540. Referring to FIGS. 5B-C, the outlet has a width WO and a length L. Dimensions in FIGS. 4-5 are in millimeters. It is noted that FIGS. 4-5 are only illustrative and the dies can, for instance, be scaled up to greater dimensions (e.g. more orifices, a greater spinneret length, a greater slit length, etc.). In the example of FIGS. 4-5, 130 orifices are shown having an outlet diameter of 0.1 mm, so $N \times D^2 = 1.3$ mm$^2$. Furthermore, the slit outlet has a length of 17 mm and a width of 0.06 mm, so a surface area of 1.02 mm$^2$ (which is about $(\pi/4) \times 1.3$ mm$^2$).

FIG. 6 represent the die 600 obtained when combining the spinneret part 400 of FIG. 4 and the second part 500 of FIG. 5. It is noted that the figure is merely schematic and that, for instance, the number of orifice rows in FIG. 6 does not correspond to the number of rows in FIG. 4.

The orifices 430 of the spinneret part 400 of FIG. 4 are arranged such that straight lines from the center of each orifice inlet 440, through the center of the corresponding orifice outlet 450, do not cross each other before the opening 520 of the second part 500 of FIG. 5.

Figure 10A:
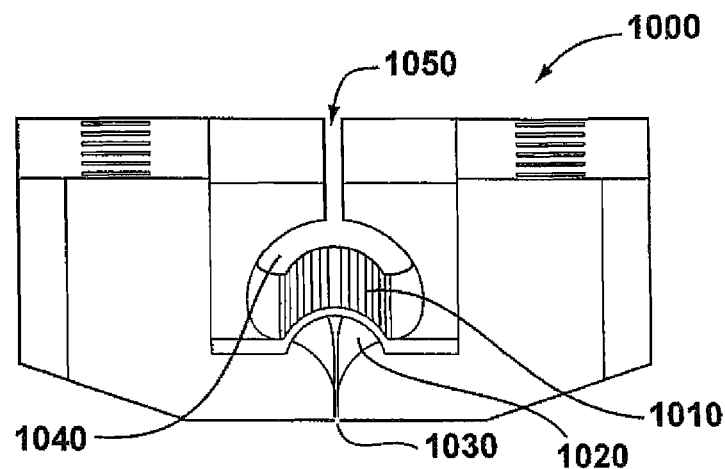
FIGS. 10A-B represent an embodiment of a die.
Figure 10B:
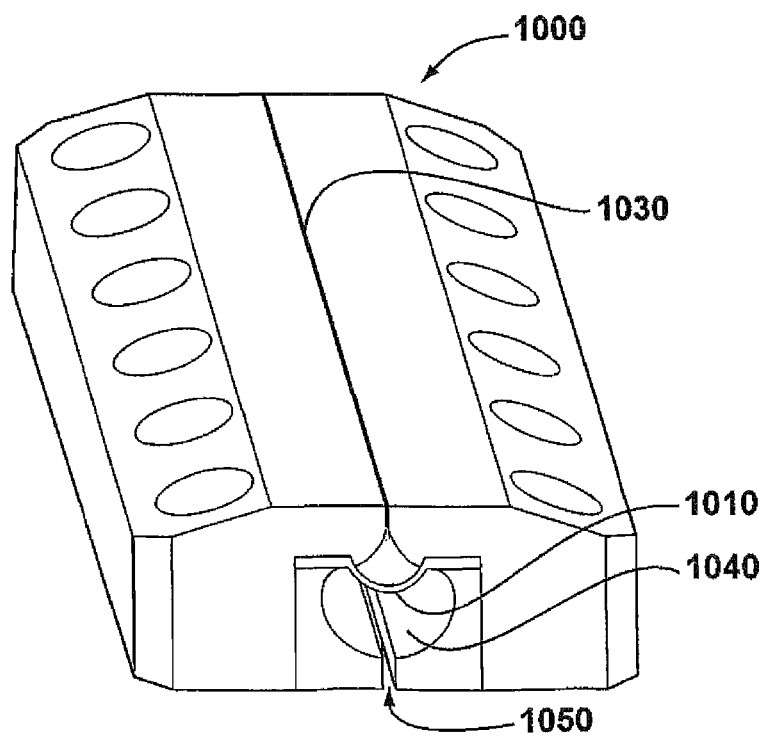

Another example of a die 1000 is provided in FIGS. 10A-B. The die has a spinneret part 1010 and a second part 1020. The orifices of the spinneret part are not shown in this Figure. In an embodiment, the orifices are in a similar arrangement as in FIG. 4. The second part has an outlet 1030 in the shape of a slit. In addition, the die has a semi-circular cylindrical space 1040, having a slit-shaped inlet 1050. A benefit of this configuration is that it allows reasonably identical inflow and reasonably constant deformation history for the material that will enter the spinneret holes of the spinneret part 1010. In an embodiment, the slit 1030 has a length of 120 mm and a width of 0.07 mm, and the spinneret part 1010 has 990 orifices with inlets and outlets both of 0.1 mm in diameter (arranged in a substantially similar way as the orifices of the spinneret part in FIG. 4, but over a length of 120 mm instead of 17 mm).

Processes

Also provided are processes for making articles, e.g. polymer articles, for instance polymer films, laminates, tubes, or bars. In an embodiment, the processes employ dies as described above.

In an embodiment, provided is a process comprising
Pressing a polymer, in melt or in solution, through a spinneret to form a plurality of polymer fibers leaving the spinneret,
the spinneret having a plurality of orifices, the orifices having an inlet for receiving the polymer melt or polymer solution and an outlet to dispatch the polymer melt or polymer solution as a fiber; and
Guiding the polymer fibers, while still in the melt or solution, through an opening to form a polymer film (or e.g. tube, bar, laminate) leaving the outlet of said opening, wherein the surface area of the outlet of the opening complies with the following formula:

$$SA < N \times D^2$$

wherein
SA represents the surface area of the outlet of the opening;
N represents the number of orifice outlets of the spinneret; and
D represents the diameter of the orifice outlets of the spinneret.

In an embodiment, provided is a process comprising:
Pressing a polymer, in melt or in solution, through a spinneret to form a plurality of polymer fibers leaving the spinneret,
the spinneret having a plurality of orifices, the orifices having an inlet for receiving the polymer melt or polymer solution and an outlet to dispatch the polymer melt or polymer solution as a fiber; and
Guiding the polymer fibers, while still in the melt or solution, through an opening to form a polymer film (or e.g. tube, bar, laminate) leaving the outlet of said opening, wherein the width W and thickness T of the film at the outlet of said opening comply with the following formula:

$$W \times T < N \times D^2$$

wherein
N represents the number of orifice outlets of the spinneret; and
D represents the diameter of the orifice outlets of the spinneret.

In an embodiment, the material is a polymer material. In an embodiment, the polymer is a thermoplast. In an embodiment, the polymer is a polyolefin, for instance polyethylene or polypropylene. In an embodiment, the polymer is a fluoropolymer, e.g. a tetrafluoroethylene polymer, for instance a co-polymer of tetrafluoroethylene with a perfluoroalkyl vinyl ether (e.g. perfluoropropyl vinyl ether) or hexafluoroethylene. In an embodiment, the polymer is a liquid-crystalline polymer. In an embodiment, the polymer is a lyotropic liquid-crystalline polymer. In an embodiment, the polymer is a thermotropic liquid-crystalline polymer. In an embodiment, the polymer is a polyaramid, e.g. poly(p-phenylene terepthalamid). In an embodiment, the polymer is a polyester, e.g. a co-polyester, for instance a poly(p-hydroxybenzoic acid-co-2-hydroxy-6-naphtoic acid)copolymer. In an embodiment, the polymer is a poly{diimidazo pyridinylene(dihydroxy) phenylene}, e.g. poly({2,6-diimidazole[4,5-b:4',5'-e]pyridinylene-1,4(2,5-dihydroxy)phenylene}). In an embodiment, the polymer is a poly(p-phenylene benzobisoxazole). In an embodiment, the polymer is a biodegradable polymer. In an embodiment, the polymer is cellulose or a cellulose derivative. Commercial examples of some of the above-mentioned polymers are, for instance, those available under the tradenames Kevlar™, Twaron™, Vectra™, M5™, and Zylon™. In an embodiment, the material is a polymer blend. In an embodiment, the material comprises, besides one or more polymer grades, one or more additives, adhesives, dyes, antioxidants, monomers, plasticizers, and the like.

In an embodiment, the polymer is in the melt when pressed through the die. In an embodiment, the polymer is in solution when pressed through the die. In an embodiment, the solution is a gel.

Figure 7:
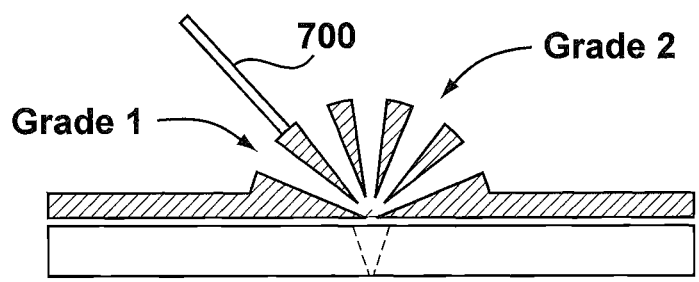
FIG. 7 represents an embodiment of a die.
Figure 8:
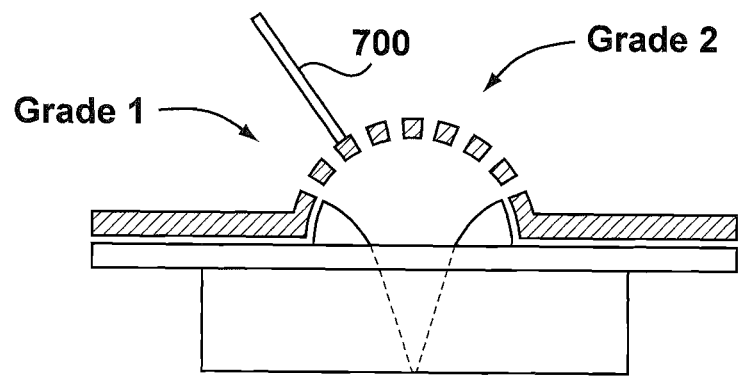
FIG. 8 represents an embodiment of a die.
Figure 9:
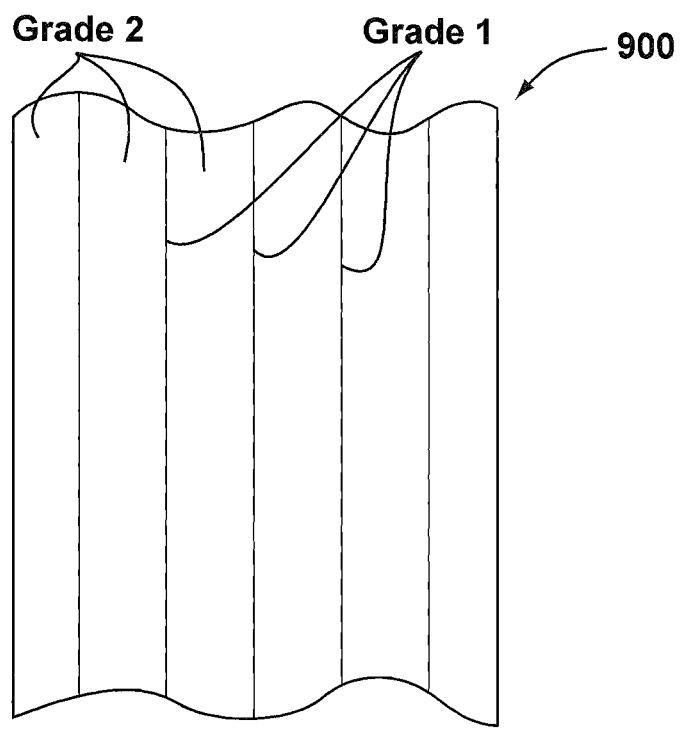
FIG. 9 represents an embodiment of a film.

In an embodiment, one polymer grade is pressed through the spinneret. In an embodiment, more than one polymer grade is pressed through the spinneret, for instance two polymer grades or three polymer grades, or four polymer grades. In an embodiment, one section of orifices in the spinneret receives one polymer grade, and another section of orifices in the spinneret receives another polymer grade. In an embodiment more than one polymer grade is pressed through the spinneret and separately through different parts of the spinneret one or more additives, adhesives, dyes, antioxidants, monomers, plasticizers and the like. For an example, see FIGS. 7 and 8. These Figures largely correspond to, respectively, FIGS. 3 and 6, except that the dies comprise a part 700 separating orifice inlets. In this manner, a polymer grade (e.g. Grade 1; FIGS. 7-8) can be controllably interspersed in another polymer grade (e.g. Grade 2; FIGS. 7-8), for instance as strains. For instance, as depicted in FIG. 9, polymer films 900 can be made having a majority of a polymer Grade 2 and a minority of strains of a polymer Grade 1. In an embodiment, the polymer grades are of a similar class. A benefit of polymer grades of similar class may be better adherence between the grades and substantially homogenous mechanical properties of the film. In an embodiment, the melting temperature of one of the grades (e.g. the grade that is present in a minor part) is lower than the melting temperature of another grade (e.g. the grade that is present in a major part). A benefit of this embodiment may be in laminating the films. For instance, laminating may be effected by heating the temperature of the films above the melting temperature of the minor polymer part but below the temperature of the major polymer part. The melting minor polymer part may then assist in gluing the films together.

In an embodiment the articles are co-extruded with a material to form a coating on the polymer articles. In an embodiment, the coating is a material that can serve as a glue when laminating polymer films.

In an embodiment, the polymer article is quenched shortly after leaving the die (e.g. by cooling, removal of solvent, or both). A benefit of quenching shortly after leaving the die, for instance in the manufacture of films, is that the width of the film leaving the die is substantially maintained. In an embodiment, the polymer article is quenched by guiding the article in a liquid, e.g. an aqueous liquid, for instance water. In an embodiment, the polymer article is quenched by exposing it to a cold gas, e.g. cold nitrogen gas. In an embodiment, the polymer article is quenched within 10 cm after leaving the die, e.g. within 5 cm, within 3 cm, within 1 cm, or even within 0.5 cm. In an embodiment, the die is in contact with the quenching zone, e.g. the liquid. In an embodiment, the polymer articles is quenched more than 0.1 mm after leaving the die, e.g. more than 0.5 mm or more than 1 mm after leaving the die.

The polymer articles may be post-treated, e.g. annealed, further stretched, cross-linked etc. In an embodiment, the articles are heat-treated (e.g. in the range of 200-280° C., for instance 260° C.) while under tensile stress e.g. at a stress in the range of 1-50 MPa, e.g. 1-10 MPa, 3 MPa, 5-40 MPa, 10-30 MPa, or 15-25 MPa).

Applications

In an embodiment, polymer films are provided, e.g. polymer films obtained with the dies described herein and/or the processes described herein. In an embodiment, the films have a width of at least 1 cm, e.g. at least 2 cm, at least 10 cm, at least 50 cm, at least 100 cm, at least 250 cm, at least 500 cm, or at least 1000 cm. In an embodiment, the width is less than 10000 cm, e.g. less than 5000 cm, less than 1000 cm, less than 200 cm, less than 100 cm, less than 50 cm, less than 20 cm, less than 15 cm, less than 10 cm, less than 8 cm, or less than 6 cm. In an embodiment, the films have a tensile modulus of at least 50 GPa. In an embodiment the tensile modulus is at least 25%, e.g. at least 35%, at least 45%, at least 55%, or at least 70% of the theoretically maximum modulus. In an embodiment, the tensile modulus is less than 200 GPa, e.g. less than 150 GPa, less than 100 GPa, or less than 75 GPa. In an embodiment, the tensile modulus is less than 95% of the theoretically maximum modulus, e.g. less than 90%, less than 85%, less than 80%, less than 65%, or less than 50% of the theoretically maximum modulus.

In an embodiment, the polymer films have a loss modulus (E"), as determined with dynamical mechanical thermal analysis at a temperature of 25° C. and a frequency of 1 Hz, of at least 0.75 GPa, e.g. at least 1 GPa, at least 1.5 GPa, at least 2 GPa, at least 2.5 GPa, or at least 2.7 GPa. In an embodiment, the loss modulus is less than 8 GPa, e.g. less than 5 GPa, less than 4 GPa, or less than 3 GPa. In an embodiment, the polymer films have a storage modulus (E'), as determined with dynamical mechanical thermal analysis at a temperature of 25° C. and a frequency of 1 Hz, of at least 20 GPa, e.g. at least 30 GPa, at least 40 GPa, at least 50 GPa, or at least 60 GPa. In an embodiment, the storage modulus is less than 100 GPa, e.g. less than 85 GPa or less than 70 GPa.

In an embodiment, the polymer films have a specific loss modulus, i.e. the loss modulus (25° C., 1 Hz) divided by the density of the film material (at 25° C.), of at least 75 km, e.g. at least 100 km, at least 125 km, at least 150 km, at least 175 km, or at least 200 km. In an embodiment, the specific loss modulus is less than 600 km, e.g. less than 450 km or less than 300 km. In an embodiment, the polymer films have a specific storage modulus, i.e. the storage modulus (25° C., 1 Hz) divided by the density of the film material (at 25° C.), of at least 1000 km, e.g. at least 2000 km, at least 3000 km, at least 4000 km, or at least 4250 km. In an embodiment, the polymer films have a specific storage modulus of less than 10000 km, e.g. less than 7500 km or less than 5000 km.

A combination of good damping (a sufficiently high loss modulus) and good stiffness (a sufficiently high storage modulus), especially on a weight basis, are of interest, for instance, in high performance damping applications (especially when light weight is important). Such as data storage systems, aerospace applications, sporting articles such as tennis rackets, hockey sticks, or any other electrical, acoustical, optical, mechanical or any other object, devise or matter that may be effected by internal or external vibrations in an undesired manner. The favorable damping properties of these tapes could also be of interest as high-damping layers in composites, for example as layers between unidirectional carbon fiber-reinforced composite plies that make up a laminate.

In an embodiment, the films have a thickness of less than 150 micrometer, e.g. less than 100 micrometer, less than 50 micrometer, less than 25 micrometer, less than 10 micrometer, or even less than 5 micrometer. In an embodiment, the films have a thickness of at least 1 micrometer, e.g. at least 2 micrometer, at least 3 micrometer, or at least 4 micrometer.

In an embodiment, the films are laminated. In an embodiment, the laminate consists of 3 layers (e.g. in a 0/60/120 configuration), of 4 layers (e.g. in a 0/45/90/135 configuration), or more than 4 layers. In an embodiment, the laminate comprises less than 20 layers, e.g. less than 15 layers, less than 10 layers, or less than 7 layers.

In an embodiment, the laminate has a tensile modulus of at least 5 GPa in at least 2 perpendicular directions in the plane of the laminate, e.g. at least 8 GPa, at least 10 GPa, or at least 12 GPa. In an embodiment, the laminate has a tensile modulus in all directions in the plane of the laminate of at least 5 GPa, e.g. at least 8 GPa, at least 10 GPa, or at least 12 GPa, or at least 15 GPa. In an embodiment, the laminate has a substantially isotropic tensile modulus in the plane of the laminate.

In an embodiment, the films are laminated using a glue on the surface of the films. In an embodiment, the laminate comprises, relative to the total weight of the laminate, less than 25 wt % glue (e.g., epoxies or relatively low melting components), e.g. less than 15 wt % glue, less than 10 wt % glue, less than 7 wt % glue, less than 4 wt % glue, or even less than 1 wt % glue. In an embodiment, no glue is used. In an embodiment, the laminate consists essentially of a single polymer grade. A benefit of using limited (or no) amounts of glue is that such glue may have a negative effect on one or more mechanical properties (for instance tensile modulus). In an embodiment, lamination is achieved by stacking tapes and subjecting the stack to elevated temperature and/or elevated pressure. In an embodiment, the films are laminated using relatively low melting components present in the films (e.g., by heating the films to above the temperature of a low melting component but below the melting temperature of a high melting component).

In an embodiment, the polymer articles (e.g. the polymer films, or the polymer laminates) are used in the manufacture of sails. Other applications are, for instance, tubes, pipes, panels, protective sheets, aerospace and automotive applications, sporting articles (e.g. tennis rackets, hockey sticks, running shoes), helmets, protective gear, furniture, containers, tows, fly wheels, high-damping layers in composites (e.g. as a layer between composite plies, e.g. unidirectional carbon fiber-reinforced composite plies, that make up a laminate). In an embodiment, the polymer articles are used in security features. For instance, the films may feature a directional haze. For instance, upon increasing the distance between a film and the text behind it, the latter may remain well-defined along the orientation direction of the foil, while perpendicular to it the image may become blurred.

Further Embodiments

1. A process comprising:
    Pressing a polymer, in melt or in solution, through a spinneret to form a plurality of polymer fibers leaving the spinneret,
        the spinneret having a plurality of orifices, the orifices having an inlet for receiving the polymer melt or polymer solution and an outlet to dispatch the polymer melt or polymer solution as a fiber; and
    Guiding the polymer fibers, while still in the melt or solution, through an opening to form a polymer film (or other object, e.g. tube or bar) leaving the outlet of said opening, wherein the surface area of the outlet of the opening complies with the following formula:

$SA < N \times D^2$ wherein
        SA represents the surface area of the outlet of the opening;
        N represents the number of orifice outlets of the spinneret; and
        D represents the diameter of the orifice outlets of the spinneret.
2. The process according to embodiment 1, wherein $SA < 0.9 \times N \times D^2$.
3. The process according to any one of embodiments 1-2, wherein $SA > 0.6 \times N \times D^2$.
4. The process according to embodiment 1, wherein SA is about $(\pi/4) \times N \times D^2$.
5. The process according to any one of embodiments 1-4, further comprising quenching said film after leaving said opening.
6. The process according to embodiment 5, wherein said quenching is effected by guiding the film through a liquid.
7. The process according to any one of embodiments 5-6, wherein said quenching takes place within 5 cm of said outlet of said opening.
8. The process according to any one of embodiments 5-6, wherein said quenching takes place within 2 cm of said outlet of said opening.
9. The process according to any one of embodiments 5-6, wherein said quenching takes place within 1 cm of said outlet of said opening.
10. The process according to any one of embodiments 5-6, wherein said quenching takes place within 0.5 cm of said outlet of said opening.
11. The process according to any one of embodiments 1-10, wherein said polymer is in the melt during said pressing.
12. The process according to any one of embodiments 1-10, wherein said polymer is in solution during said pressing.
13. The process according to embodiment 12, wherein the polymer solution is a gel.
14. The process according to any one of embodiments 1-13, wherein said polymer is a polyolefin.
15. The process according to any one of embodiments 1-13, wherein said polymer is a liquid-crystalline polymer.
16. The process according to any one of embodiments 1-11, wherein said polymer is a thermotropic liquid-crystalline polymer.
17. The process according to any one of embodiments 1-10 and 12, wherein said polymer is a lyotropic liquid-crystalline polymer.
18. The process according to any one of embodiments 1-17, wherein said plurality of polymer fibers do not cross each other when traveling from said orifice outlets to said outlet of said opening.
19. The process according to any one of embodiments 1-18, wherein for each of said plurality of polymer fibers the distance from its orifice outlet to its destination in said opening is about the same.
20. The process according to any one of embodiments 1-19, the diameter of the orifice outlets being less than 200 micrometers.
21. The process according to any one of embodiments 1-19, the distance between any of the orifice outlets and the nearest point of the opening outlet being less than 5 cm.
22. The process according to any one of embodiments 1-21, wherein the outlet of said opening is a slit.
23. The process according to embodiment 22, the outlet of said slit having a length of at least 2 cm.
24. The process according to embodiment 22, the outlet of said slit having a length of at least 5 cm.
25. The process according to embodiment 22, the outlet of said slit having a length of at least 8 cm.
26. The process according to any one of embodiments 22-25, the outlet of said slit having a length of less than 100 cm.
27. The process according to any one of embodiments 22-25, the outlet of said slit having a length of less than 20 cm.
28. The process according to any one of embodiments 22-25, the outlet of said slit having a length of less than 12 cm.
29. The process according to any one of embodiments 1-28, wherein further comprising co-extruding the polymer film with a coating material.
30. The process according to embodiment 29, wherein said coating material can function as a glue when laminating the films.
31. The process according to any one of embodiments 1-30, wherein a single polymer grade is fed to the spinneret.

32. The process according to any one of embodiments 1-30, wherein more than one single polymer grade is fed to the spinneret.
33. The process according to embodiment 32, wherein a majority of orifices in the spinneret receive a first polymer grade, and the minority of orifices in the spinneret receive a second polymer grade.
34. The process according to embodiment 33, wherein more than 90% of the orifices receive the first polymer grade.
35. The process according to embodiment 33, wherein more than 95% of the orifices receive the first polymer grade.
36. The process according to any one of embodiments 33-35, wherein the first polymer grade and the second polymer grade have melting temperatures that differ at least 10 C.
37. The process according to any one of embodiments 33-36, wherein the first polymer grade and the second polymer grade have melting temperatures that differ at most 50 C.
38. The process according to any one of embodiments 33-37, wherein the first polymer grade and the second polymer grade are of the same polymer family.
39. The process according to any one of embodiments 33-38, wherein the first polymer grade and the second polymer grade are both polyolefin polymers or both liquid-crystalline polymers.
40. A film obtainable with the process according to any one of embodiments 1-39.
41. A film obtainable with the process according to any one of embodiments 1-40, wherein the outlet of said opening is a slit and the film has a width that is at least 70% of the length of said slit.
42. The film of embodiment 41, wherein said width is at least 90% of the length of said slit.
43. A process comprising:
   Pressing a polymer, in melt or in solution, through a spinneret to form a plurality of polymer fibers leaving the spinneret,
      the spinneret having a plurality of orifices, the orifices having an inlet for receiving the polymer melt or polymer solution and an outlet to dispatch the polymer melt or polymer solution as a fiber; and
   Guiding the polymer fibers, while still in the melt or solution, through an opening to form a polymer film leaving the outlet of said opening, wherein the width W and thickness T of the film at the outlet of said opening comply with the following formula:

$$W \times T < N \times D^2$$

wherein
      N represents the number of orifice outlets of the spinneret; and
      D represents the diameter of the orifice outlets of the spinneret.
44. The process according to embodiment 43, wherein $W \times T < 0.9 \times N \times D^2$.
45. The process according to any one of embodiments 43-44, wherein $W \times T > 0.6 \times N \times D^2$.
46. The process according to embodiment 43, wherein $W \times T$ is about $(\pi/4) \times N \times D^2$.
47. The process according to any one of embodiments 43-46, further comprising quenching said film after leaving said opening.
48. The process according to embodiment 47, wherein said quenching is effected by guiding the film through a liquid.
49. The process according to any one of embodiments 47-48, wherein said quenching takes place within 5 cm of said outlet of said opening.
50. The process according to any one of embodiments 47-48, wherein said quenching takes place within 2 cm of said outlet of said opening.
51. The process according to any one of embodiments 47-48, wherein said quenching takes place within 1 cm of said outlet of said opening.
52. The process according to any one of embodiments 47-48, wherein said quenching takes place within 0.5 cm of said outlet of said opening.
53. The process according to any one of embodiments 43-52, wherein said polymer is in the melt during said pressing.
54. The process according to any one of embodiments 43-52, wherein said polymer is in solution during said pressing.
55. The process according to embodiment 54, wherein the polymer solution is a gel.
56. The process according to any one of embodiments 43-55, wherein said polymer is a polyolefin.
57. The process according to any one of embodiments 43-55, wherein said polymer is a liquid-crystalline polymer.
58. The process according to any one of embodiments 43-53, wherein said polymer is a thermotropic liquid-crystalline polymer.
59. The process according to any one of embodiments 43-52 and 54, wherein said polymer is a lyotropic liquid-crystalline polymer.
60. The process according to any one of embodiments 43-59, wherein said plurality of polymer fibers do not cross each other when traveling from said orifice outlets to said outlet of said opening.
61. The process according to any one of embodiments 43-60, wherein for each of said plurality of polymer fibers the distance from its orifice outlet to its destination in said opening is about the same.
62. The process according to any one of embodiments 43-61, the diameter of the orifice outlets being less than 200 micrometers.
63. The process according to any one of embodiments 43-61, the distance between any of the orifice outlets and the nearest point of the opening outlet being less than 5 cm.
64. The process according to any one of embodiments 43-63, wherein the outlet of said opening is a slit.
65. The process according to embodiment 64, the outlet of said slit having a length of at least 2 cm.
66. The process according to embodiment 64, the outlet of said slit having a length of at least 5 cm.
67. The process according to embodiment 64, the outlet of said slit having a length of at least 8 cm.
68. The process according to any one of embodiments 64-67, the outlet of said slit having a length of less than 100 cm.
69. The process according to any one of embodiments 64-67, the outlet of said slit having a length of less than 20 cm.
70. The process according to any one of embodiments 64-67, the outlet of said slit having a length of less than 12 cm.
71. The process according to any one of embodiments 43-70, wherein further comprising co-extruding the polymer film with a coating material.
72. The process according to embodiment 71, wherein said coating material can function as a glue when laminating the films.
73. The process according to any one of embodiments 43-72, wherein a single polymer grade is fed to the spinneret.
74. The process according to any one of embodiments 43-72, wherein more than one single polymer grade is fed to the spinneret.

75. The process according to embodiment 74, wherein a majority of orifices in the spinneret receive a first polymer grade, and the minority of orifices in the spinneret receive a second polymer grade.
76. The process according to embodiment 75, wherein more than 90% of the orifices receive the first polymer grade.
77. The process according to embodiment 75, wherein more than 95% of the orifices receive the first polymer grade.
78. The process according to any one of embodiments 75-77, wherein the first polymer grade and the second polymer grade have melting temperatures that differ at least 10 C.
79. The process according to any one of embodiments 75-78, wherein the first polymer grade and the second polymer grade have melting temperatures that differ at most 50 C.
80. The process according to any one of embodiments 75-79, wherein the first polymer grade and the second polymer grade are of the same polymer family.
81. The process according to any one of embodiments 75-80, wherein the first polymer grade and the second polymer grade are both polyolefin polymers or both liquid-crystalline polymers.
82. A film obtainable with the process according to any one of embodiments 43-81.
83. A film obtainable with the process according to any one of embodiments 43-82, wherein the outlet of said opening is a slit and the film has a width that is at least 70% of the length of said slit.
84. The film of embodiment 83, wherein said width is at least 90% of the length of said slit.
85. A process comprising:
    Pressing more than one polymer grade, each in melt or in solution, through a spinneret to form a plurality of polymer fibers leaving the spinneret,
        the spinneret having a plurality of orifices, the orifices having an inlet for receiving the polymer melt or polymer solution and an outlet to dispatch the polymer melt or polymer solution as a fiber; and
    Guiding the polymer fibers, while still in the melt or solution, through an opening to form a polymer film (or other object, e.g. tube or bar) leaving the outlet of said opening,
    wherein a first polymer grade is pressed through the majority of the orifices of the spinneret, and a second polymer grade is pressed through one or more of the remaining orifices.
86. The process of embodiment 85, wherein said second polymer grade is pressed through all of the remaining orifices.
87. The process of embodiment 85, wherein a third polymer grade is pressed through one or more of the remaining orifices.
88. The process of embodiment 85-87, wherein all said polymer grades belong to the same class of polymers.
89. The process of embodiments 85-87, wherein all said polymer grades are polyolefins.
90. The process of embodiments 85-87, wherein all said polymer grades are thermotropic liquid-crystalline polymers.
91. The process of embodiments 85-87, wherein all said polymer grades are lyotropic liquid-crystalline polymers.
92. The process of embodiments 85-91, wherein 2 of the polymer grades have a melting temperature difference of at least 10° C.
93. The process of embodiments 85-92, wherein 2 of the polymer grades have a melting temperature difference of at most 10° C.
94. The process of embodiments 85-93, wherein one of the polymer grades is fed to at least 90% of the orifices.
95. The process of embodiments 85-93, wherein one of the polymer grades is fed to at least 95% of the orifices.
96. The process of embodiments 85-93, wherein one of the polymer grades is fed to at least 98% of the orifices.
97. A film obtained with the process of embodiment 93.
98. A film of liquid-crystalline polymer, the film having:
    a width of at least 5 cm; and
    a tensile modulus that is 25% or more of the maximum theoretical modulus.
99. The film of embodiment 98, wherein the width is at least 8 cm.
100. The film of embodiment 98 or 99, wherein the width is less than 50 cm.
101. A film of liquid-crystalline polymer, the film having:
    a width of at least 5 cm; and
    a tensile modulus of at least 50 GPa.
102. The film of embodiment 101, wherein the width is at least 8 cm.
103. The film of embodiment 101 or 102, wherein the width is less than 50 cm.
104. A laminate of films of liquid-crystalline polymer, the laminate having a modulus of at least 10 GPa in at least 2 perpendicular directions in the plane of the laminate.
105. A laminate of films of liquid-crystalline polymer, the laminate having a modulus of at least 10 GPa in all directions in the plane of the laminate.
106. The laminate according to any one of embodiments 104-105, said laminate comprising at least 3 layers of film.
107. The laminate according to any one of embodiments 104-105, said laminate comprising at least 4 layers of film.
108. The film according to any one of embodiments 98-103 or the laminate according to any one of embodiments 104-107, the polymer being a thermotropic liquid-crystalline polymer.
109. The film or laminate according to embodiment 108, the polymer being a copolyester.
110. The film according to any one of embodiments 98-103 or the laminate according to any one of embodiments 104-107, the polymer being a lyotropic liquid-crystalline polymer.
111. A sail comprising the film or laminate according to any one of embodiments 98-110.
112. A security feature comprising the film according to any one of embodiments 98-103 or 108-110.
113. A die, comprising:
    a spinneret part having a plurality of orifices, the orifices having an inlet and an outlet;
    a second part having an opening for receiving fibers from the orifice outlets, the opening having an outlet facing away from the orifice outlets;
    wherein the surface area of the outlet of the opening complies with the following formula:

$$SA < N \times D^2$$

wherein
        SA represents the surface area of the outlet of the opening;
        N represents the number of orifice outlets of the spinneret part; and
        D represents the diameter of the orifice outlets of the spinneret part.
114. The die according to embodiment 113, wherein $SA < 0.9 \times N \times D^2$.
115. The die according to any one of embodiments 113-114, wherein $SA > 0.6 \times N \times D^2$.
116. The die according to embodiment 113, wherein SA is about $(\pi/4) \times N \times D^2$.

117. The die according to any one of embodiments 113-116, wherein the spinneret part is curved.

118. The die according to any one of embodiments 113-117, wherein the orifices have inlets that have a greater surface area than their corresponding orifice outlet.

119. The die according to embodiment 118, wherein the channel between the orifice inlets and their corresponding orifice outlet is cone-shaped.

120. The die according to any one of embodiments 113-117, wherein the orifices have an inlet that has about the same surface area as the outlet.

121. The die according to any one of embodiments 113-120, wherein the outlet of said orifices have a diameter in the range of 50-250 micrometers.

122. The die according to any one of embodiments 113-121, wherein said outlet of said opening is a slit.

123. The die according to any one of embodiments 113-122, wherein the part comprising said orifices and the part comprising said opening are releasably connected.

124. The die according to any one of embodiments 113-122, wherein the part comprising said orifices and the part comprising said opening are unreleasably connected.

125. A die, comprising:
a spinneret part having a plurality of orifices, the orifices having an inlet and an outlet;
a second part having an opening for receiving fibers from the orifice outlets, the opening having an outlet facing away from the orifice outlets;
wherein the die complies with the following formula:

$$EL \times WO < N \times D^2.$$

wherein
N represents the number of orifice outlets of the spinneret part;
D represents the diameter of the orifice outlets of the spinneret part;
WO represents the width of the opening; and
EL represents the length of the opening designed to receive material from the spinneret part.

126. The die according to embodiment 125, wherein $EL \times WO < 0.9 \times N \times D^2$.

127. The die according to any one of embodiments 125-127, wherein $EL \times WO > 0.6 \times N \times D^2$.

128. The die according to embodiment 125, wherein $EL \times WO$ is about $(\pi/4) \times N \times D^2$.

129. The die according to any one of embodiments 125-128, wherein the spinneret part is curved.

130. The die according to any one of embodiments 125-129, wherein the orifices have inlets that have a greater surface area than their corresponding orifice outlet.

131. The die according to embodiment 130, wherein the channel between the orifice inlets and their corresponding orifice outlet is cone-shaped.

132. The die according to any one of embodiments 125-129, wherein the orifices have an inlet that has about the same surface area as the outlet.

133. The die according to any one of embodiments 125-132, wherein the outlet of said orifices have a diameter in the range of 50-250 micrometers.

134. The die according to any one of embodiments 125-133, wherein said outlet of said opening is a slit.

135. The die according to any one of embodiments 125-134, wherein the part comprising said orifices and the part comprising said opening are releasably connected.

136. The die according to any one of embodiments 125-134, wherein the part comprising said orifices and the part comprising said opening are unreleasably connected.

137. A die, comprising:
a spinneret part having a plurality of orifices, the orifices having an inlet and an outlet;
a second part having an opening for receiving fibers from the orifice outlets, the opening having an opening inlet facing the orifice outlets and an opening outlet facing away from the orifice outlets;
the orifices being arranged such that straight lines from the center of each orifice inlet, through the center of the corresponding orifice outlet, to the opening inlet, do not cross each other.

138. A die, comprising spinneret part having a plurality of orifices, the orifices having an inlet and an outlet;
a second part having an opening for receiving fibers from the orifice outlets, the opening having an opening inlet facing the orifice outlets and an opening outlet facing away from the orifice outlets;
the spinneret part and second part being constructed and arranged such that fibers coming from the spinneret part do not touch before reaching the second part.

139. The die of embodiment 138, wherein the fibers touch along a substantially straight line.

140. The die according to any one of embodiments 113-139, wherein the orifices are arranged in staggered arrays.

141. A polymer film having a width of at least 2 cm, a loss modulus greater than 0.75 GPa, and a storage modulus greater than 20 GPa.

142. The film of embodiment 141, wherein the loss modulus is greater than 2 GPa.

143. A polymer film having a width of at least 2 cm, a specific loss modulus greater than 75 km, and a specific storage modulus greater than 1000 km.

144. The film of embodiment 143, wherein the specific loss modulus is greater than 150 km.

145. The film according to any one of embodiments 143-144, wherein the specific storage modulus is greater than 3000 km.

146. The polymer film according to any one of embodiments 141-145, wherein the film consists essentially of a single polymer grade.

147. The polymer film according to any one of embodiments 141-145, wherein the film consists essentially of a blend of two or more polymer grades.

EXAMPLES

The following examples are given as particular embodiments of the invention and to demonstrate the practice and advantages thereof. It is understood that the examples are given by way of illustration and are not intended to limit the specification or the claims that follow in any manner.

Mechanical properties: tensile modulus (also referred to below as E-modulus), strength (or stress) at break, and elongation at break were measured under the following testing conditions: gauge length for the samples below comprising poly(p-hydroxybenzoic acid-co-2-hydroxy-6-naphtoic acid) copolymer was in the range of 50 mm-100 mm, crosshead speed was 10% of the gauge length/min (e.g. for a 50 mm sample, the crosshead speed was 5 mm/min), and at room temperature. For the samples below comprising polyethylene, gauge length was 50 mm, crosshead speed 5 mm/min, and at room temperature.

The polymer "Vectra™ A950" referred to in below examples is a poly(p-hydroxybenzoic acid-co-2-hydroxy-6-naphtoic acid)copolymer from Ticona, Germany. It is believed to consist of about 25-27 mole percent of 6-oxy-2-naphthoyl moieties and 73-75 mole percent of p-oxybenzoyl moieties. It is a thermotropic liquid-crystalline polymer with a melting temperature of about 280° C., and a density "p" (at 25° C.) of about 1.4 g/cm$^3$. Before use, it was dried overnight at 80° C. under vacuum.

The single screw extruder referred to in below examples is the Teach-Line E20T SCD15 single screw extruder from Dr. Collin GmbH, Ebersberg, Germany.

The twin screw extruder referred to in below examples is the Teach-Line twin-screw-extruder 2K25T from Dr. Collin GmbH, Ebersberg, Germany.

Example 1

The material used was Vectra™ A950. Tapes were produced by continuous extrusion at 300° C., using a single screw extruder, equipped with a home-made die similar to the die of FIG. 10 (with the slit having a length of 120 mm and a width of 0.07 mm, and the spinneret part having 990 orifices with inlets and outlets both of 0.1 mm in diameter (arranged in a substantially similar way as the orifices of the spinneret part in FIG. 4, but over a length of 120 mm instead of 17 mm)). Various extrusion speeds were used, in the range of 10-60 rpm. The tapes were collected on a winder (from DACA Instruments, Santa Barbara, USA). Various winder forces were used, up to a winder speed of 250 m/min. Tapes were produced albeit inhomogeneous, e.g. contained cavities and/or varied substantially in thickness over their width.

Example 2

The experiment of example 1 was repeated, but now with a reduced slit width outlet of 0.07 mm (and the range within which the winder speed was varied was less, i.e. max. winder speed was below 125 m/min). Transparent tapes were produced of good quality, including tapes having a tensile modulus in the drawing direction of 59 GPa.

Example 3

Tape produced by Example 2 was placed slightly above a page of typewritten text, once with the drawing direction of the tape being perpendicular to the sentences on the page, and once with the drawing direction of the tape being parallel to the sentences on the page. When the drawing direction was parallel to the sentences, the sentences could readily be read. When perpendicular, the text was distorted.

Example 4

Tape of Example 2 was wound under tension around a steel bar. Thickness of the eventual layer wound around the bar was about 1 mm. The bar with tape was exposed for 3 hours to 250° C. under nitrogen atmosphere. The steel bar was then separated from the wound tape. The wound tape formed a hollow tube.

Example 5

Tape of Example 2 was stacked in a quasi-isotropic tape lay-up (0/45/−45/90). The stack was then exposed to 250° C. for three hours at a pressure of 0.5 MPa in a vacuum mold, resulting in a plate with a thickness of 1.7 mm. The plate had a semi-transparent appearance.

Example 6

Tape of Example 2 (thickness 0.007 mm, E-Modulus=50 GPa) was stacked into a quasi-isotropic complex. This was done by stacking 4 pieces of tape on top of each other at the following angles: 0/45/−45/90. The stack of tapes was then transferred into a vacuum mold and exposed to 250° C. for 1 hour at a pressure of 0.5 MPa. The resulting sheet had substantially isotropic mechanical properties in the sheet plane, which are listed in the following Table 1.

TABLE 1

| | |
|---|---|
| E-modulus | 13.7 GPa |
| Strength at break | 0.2 GPa |
| Thickness of tape | 25 µm |
| Elongation at break | 2.2% |

Example 7

Vectra™ A950 was fed into a single-screw extruder with a diameter of 20 mm and operated at a temperature of 320° C. and at 80 rpm. The extruder was connected to a same die as in Example 1. The temperature of the die was set to 290° C.

The extruded tape was quenched at a distance of 2 mm from the die by a metallic box which had internal water cooling. A support film, made of polypropylene, was guided over that box to prevent attaching of the extruded Vectra™ film. The Vectra™ tape on the support film was then guided over a set of speed controlling rollers and wound up on a roll. The take up speed was set to 1 m/s.

When the system reached its steady state, the pressure at the end of the extruder barrel was about 60 bars. The Vectra™ tape had a width of 120 mm and a thickness of 0.005 mm. The mechanical properties of the tape are listed in Table 2.

TABLE 2

| | | |
|---|---:|---|
| E-modulus, parallel to extrusion direction | 71.4 | GPa |
| Strength at break, parallel to extrusion direction | 1 | GPa |
| E-modulus, perpendicular to extrusion direction | 1 | GPa |
| Strength at break, perpendicular to extrusion direction | 0.015 | GPa |
| Thickness of tape | 5 | µm |
| Width of tape | 120 | mm |
| Elongation at break | 1.48% | |

Example 8

90% wt. of Vectra™ A950 was mixed with 10% wt. polybutylene terephthalate ("PBT") (Ultradur B 4520, BASF, Germany) using a twin-screw extruder, with a melt pump attached to it to better control the filling of the extruder. The equipment was operated at a temperature of 300° C. The end of the meltpump was provided with a nozzle from which the polymer strand was cooled in a water bath and then granulated with a rotating knife.

Subsequently the granulated material was dried and then fed into a single-screw extruder with a diameter of 20 mm and operated at a temperature of 320° C. and operated at 70 rpm. The extruder was connected to a same die as in Example 1. The temperature of the die was set to 285° C. The speed of the take-up rolls was 0.3 m/s.

When the system reached its steady state, the pressure at the end of the extruder barrel was about 50 bars. The Vectra™/PBT-tape had a width of 120 mm and a thickness of 0.014 mm. The mechanical properties of the tape are listed in Table 3.

TABLE 3

| | |
|---|---|
| E-modulus, parallel to extrusion direction | 43 GPa |
| Strength at break, parallel to extrusion direction | 0.6 GPa |
| E-modulus, perpendicular to extrusion direction | 1 GPa |
| Strength at break, perpendicular to extrusion direction | 0.015 GPa |
| Thickness of tape | 14 μm |
| Width of tape | 120 mm |
| Elongation at break | 1.6% |

Complexes of several layers of the tapes were obtained by pressing them at 250° C. for 15 minutes at a pressure of 1.5 MPa. The temperature of 250° C. was above the melting point of the PBT (220° C.) but below the melting point of the Vectra™ (280° C.).

Example 9

Vectra™ film obtained in example 7 was exposed to 200° C. in a nitrogen atmosphere at a tension of 20 MPa for 15 hours. Mechanical properties of the thus treated film are listed below in Table 4. E.g., the E-modulus increased by 21% compared to the film before treatment.

TABLE 4

| | |
|---|---|
| E-modulus, parallel to extrusion direction | 86.9 GPa |
| Strength at break, parallel to extrusion direction | 1.1 GPa |
| Thickness of tape | 5 μm |
| Width of tape | 120 mm |
| Elongation at break | 1.5% |

Example 10

Vectra™ film obtained in example 7 was exposed to 230° C. in a nitrogen atmosphere at a tension of 10 MPa for 15 hours. Mechanical properties of the thus treated film are listed In the Table 5 below. E.g., the stress at break increased by 25% and the elongation at break increased by 33% compared to the film before treatment.

TABLE 5

| | |
|---|---|
| E-modulus, parallel to extrusion direction | 67.4 GPa |
| Strength at break, parallel to extrusion direction | 1.3 GPa |
| Thickness of tape | 5 μm |
| Width of tape | 120 mm |
| Elongation at break | 2% |

Example 11

A mixture consisting of 15% wt. UHMW PE having a weight-average molecular weight of $8.7 \cdot 10^6$ g/mol (DSM, The Netherlands, Stamylan® UH 610) and 85% wt. of a paraffin wax having a average molecular weight of 1860 g/mol (Sasol GmbH, Germany, Sasolwax 6403) was prepared by mixing the components in the appropriate amounts in a tumbler at room temperature for one hour. Subsequently, the mixture was transferred to a twin-screw-extruder. Directly connected to the extruder was a melt pump (from Dr. Collin GMBH, Germany, 1.2 cm³/U). The melt pump head was connected to a die as in FIG. 6 (having the spinneret part of FIG. 4 and the slit part of FIG. 5 (including the same dimensions as in FIGS. 4-5)). The equipment was operated at a temperature of 200° C., the twin-screw-extruder was running at 160 rpm and the melt-pump operated at 20 rpm. The extruded film was rolled up at a speed of 0.6 m/s and had a width of 14 mm and a thickness of 0.012 mm. The mechanical properties of the tape are listed in Table 6. The tape displayed a double yield point in the stress-strain curve (therefore, two E-modulus values are indicated in the Table).

TABLE 6

| | |
|---|---|
| E-modulus 1 | 2.4 Gpa |
| E-modulus 2 | 2.2 GPa |
| Stress at break | 103.5 MPa |
| Strain at break | 8% |

Example 12

Tape of example 11 was immersed in decalin (decahydronaphthalene) for 10 minutes at 80° C. to dissolve the paraffin component of the tape. The tape was constrained in the extrusion direction during the treatment. The thickness of the tape reduced to 0.004 mm. Its mechanical properties are listed in Table 7. The tape displayed a double yield point in the stress-strain curve (therefore, two E-modulus values are indicated in the Table).

TABLE 7

| | |
|---|---|
| E-modulus 1 | 10 GPa |
| E-modulus 2 | 9.6 GPa |
| Stress at break | 384.9 MPa |
| Strain at break | 10% |

Example 13

Example 11 was repeated, except the die part was changed to a die as depicted in FIG. 3 ((having the spinneret part of FIG. 1 and the slit part of FIG. 2 (including the same dimensions as in FIGS. 1-2)). The extruded film was rolled up at a speed of 0.6 m/s and had a width of 15 mm and a thickness of 0.018 mm. The mechanical properties of the tape are listed in Table 8. The tape displayed a double yield point in the stress-strain curve (therefore, two E-modulus values are indicated in the Table).

TABLE 8

| | |
|---|---|
| E-modulus 1 | 1.7 Gpa |
| E-modulus 2 | 1.8 Gpa |
| Stress at break | 93 MPa |
| Strain at break | 8% |

Comparative Example A

Example 11 was repeated, except the die consisted only of the slit part which is displayed in FIG. 2. The extruded film was rolled up at a speed of 0.6 m/s and had a width of 15 mm and a thickness of 0.023 mm. The mechanical properties of the tape are listed in Table 9. The tape displayed a double yield point in the stress-strain curve, (therefore, two E-modulus values are indicated in the Table).

TABLE 9

| | |
|---|---|
| E-modulus 1 | 1.5 GPa |
| E-modulus 2 | 2.4 GPa |
| Stress at break | 85 MPa |
| Strain at break | 8% |

Comparative Example B

The tape of comparative example A was immersed in decaline (decahydronaphthalene) for 10 minutes at 80° C. to dissolve the paraffin component of the tape. The tape was constrained in the extrusion direction during the treatment. The thickness of the tape reduced to 0.0068 mm. Its mechanical properties are listed in Table 10. The tape displayed a double yield point in the stress-strain curve, (therefore, two E-modulus values are indicated in the Table).

TABLE 10

| | |
|---|---|
| E-modulus 1 | 5.42 GPa |
| E-modulus 2 | 6.46 GPa |
| Stress at break | 353.4 MPa |
| Strain at break | 13% |

Example 14

A quantity of 5 g of the lyotropic polymer poly(p-phenylene terepthalamide) was dissolved in 15 ml 98% sulfuric acid at 80° C. Dissolution was carried out over 6 hrs using a glass-walled, stainless steel double-helix mixer under argon atmosphere. The poly(p-phenylene terepthalamide) was obtained from E.I. du Pont de Nemours and had an inherent viscosity of 7.8 dl/g.

The solution was extruded at 90° C. with the SPINLINE tool from DACA Instruments, Santa Barbara, USA (a laboratory-scale, piston-driven extrusion apparatus), equipped with a die as in FIG. 6 (having the spinneret part of FIG. 4 and the slit part of FIG. 5 (including the same dimensions as in FIGS. 4-5)). Extrusion speed was 25 mm/min, corresponding to a throughput of 11 g/min. The extrudate was drawn manually with tweezers into a water coagulation bath (estimated drawing speed: about 20 m/min). The air gap between the outlet of the die and the water was about 1 mm. A light-yellow tape with a width of 12 mm was obtained. The tape was clearly birefringent under polarized light.

Example 15

Vectra™ tape of Example 7 was tested in a Dynamical mechanical thermal analysis (DMTA, Mettler DMA861e, Greifensee, Switzerland) instrument. Isothermal scans of tapes in the extrusion direction were measured at 1, 10 and 100 Hz in the temperature range from −80 to 140° C. in one degree steps.

The tested sample had a width of 3 mm and a length of 8 mm. The sample was pre-tensioned with a load of 1 N and as maximum values for the excitation a load of 0.25 N and for the amplitude 4 μm were chosen. The storage modulus E', loss modulus E" and the loss factor tan(δ)=(E"/E') were recorded as a function of temperature at three frequencies: 1, 10, and 100 Hz. See Table 11.

TABLE 11

E', E" and tan (δ) at selected temperatures

| Temperature [° C.] | Frequency [Hz] | E' [GPa] | E'/p [km] | E" [GPa] | E"/p [km] | tan d (δ) [—] |
|---|---|---|---|---|---|---|
| −80 | 1 | 85.62 | 6228 | 1.01 | 73 | 0.01 |
| | 10 | 86.57 | 6297 | 0.55 | 40 | 0.006 |
| | 100 | 86.83 | 6316 | 0.182 | 13 | 0.002 |
| 0 | 1 | 68.36 | 4972 | 2.63 | 191 | 0.03 |
| | 10 | 71.52 | 5202 | 2.09 | 152 | 0.029 |
| | 100 | 74.8 | 5441 | 1.26 | 92 | 0.017 |
| 25 | 1 | 60.12 | 4373 | 2.79 | 203 | 0.05 |
| | 10 | 64.1 | 4662 | 2.83 | 206 | 0.042 |
| | 100 | 67.67 | 4922 | 2.4 | 175 | 0.036 |
| 80 | 1 | 44.63 | 3246 | 1.8 | 131 | 0.041 |
| | 10 | 46.9 | 3411 | 1.95 | 142 | 0.042 |
| | 100 | 49.76 | 3619 | 2.6 | 189 | 0.052 |
| 120 | 1 | 35.41 | 2576 | 1.17 | 85 | 0.033 |
| | 10 | 36.7 | 2669 | 1.03 | 75 | 0.028 |
| | 100 | 37.89 | 2756 | 1.06 | 77 | 0.028 |

The tape combines a low density with good damping (E") and stiffness (E').

What is claimed is:

1. A process comprising:
   Pressing a polymer, in melt or in solution, through a spinneret to form a plurality of polymer fibers leaving the spinneret,
   the spinneret having a plurality of orifices, the orifices having an inlet for receiving the polymer melt or polymer solution and an outlet to dispatch the polymer melt or polymer solution as a fiber; and
   Guiding the polymer fibers, while still in the melt or solution, through an opening to form a polymer film leaving the outlet of said opening, wherein the surface area of the outlet of the opening complies with the following formula:

$$SA < N \times D^2$$

wherein
   SA represents the surface area of the outlet of the opening;
   N represents the number of orifice outlets of the spinneret; and
   D represents the diameter of the orifice outlets of the spinneret.

2. The process according to claim 1, wherein $SA < 0.9 \times N \times D^2$.

3. The process according to claim 2, wherein $SA > 0.6 \times N \times D^2$.

4. The process according to claim 1, wherein SA is about $(\pi/4) \times N \times D^2$.

5. The process according to claim 1, further comprising quenching said film after leaving said opening.

6. The process according to claim 5, wherein said quenching is effected by guiding the film through a liquid.

7. The process according to claim 5, wherein said quenching takes place within 1 cm of said outlet of said opening.

8. The process according to claim 1, wherein said polymer is in the melt during said pressing.

9. The process according to claim 1, wherein said polymer is in solution during said pressing.

10. The process according to claim 1, wherein said polymer is a thermotropic liquid-crystalline polymer.

11. The process according to claim 1, wherein said plurality of polymer fibers do not cross each other when traveling from said orifice outlets to said outlet of said opening.

12. The process according to claim 1, wherein for each of said plurality of polymer fibers the distance from its orifice outlet to its destination in said opening is about the same.

13. The process according to claim 1, further comprising co-extruding the polymer film with a coating material.

14. The process according to claim 1, wherein a single polymer grade is fed to the spinneret.

15. The process according to claim 1, wherein more than one single polymer grade is fed to the spinneret.

16. The process according to claim 15, wherein a majority of orifices in the spinneret receive a first polymer grade, and the minority of orifices in the spinneret receive a second polymer grade.

* * * * *